(12) United States Patent
Tähtinen et al.

(10) Patent No.: US 11,312,600 B2
(45) Date of Patent: Apr. 26, 2022

(54) FASTENING DEVICE FOR HOISTING ROPE OF HOISTING DEVICE

(71) Applicant: KONECRANES GLOBAL CORPORATION, Hyvinkää (FI)

(72) Inventors: Jenni Tähtinen, Hyvinkää (FI); Henri Kokko, Hyvinkää (FI); Niko Laukkanen, Hyvinkää (FI); Adeyinka Abass, Hyvinkää (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 203 days.

(21) Appl. No.: 16/771,015

(22) PCT Filed: Dec. 12, 2018

(86) PCT No.: PCT/FI2018/050910
§ 371 (c)(1),
(2) Date: Jun. 9, 2020

(87) PCT Pub. No.: WO2019/115879
PCT Pub. Date: Jun. 20, 2019

(65) Prior Publication Data
US 2021/0179401 A1    Jun. 17, 2021

(30) Foreign Application Priority Data
Dec. 12, 2017   (FI) ...................................... 20176108

(51) Int. Cl.
*B66D 1/26* (2006.01)
*B66D 3/26* (2006.01)
(Continued)

(52) U.S. Cl.
CPC ................. *B66D 3/26* (2013.01); *B66D 3/06* (2013.01); *F16G 11/04* (2013.01); *F16G 11/046* (2013.01); *B66D 2700/026* (2013.01)

(58) Field of Classification Search
CPC ...... B66D 3/26; B66D 3/06; B66D 2700/026; F16G 11/04; F16G 11/046
See application file for complete search history.

(56) References Cited

U.S. PATENT DOCUMENTS 3,795,952 A    3/1974   Ratcliff
5,855,254 A    1/1999   Blochle
(Continued)

FOREIGN PATENT DOCUMENTS

CN    1126171 A      7/1996
CN    204477180 U    7/2015
(Continued)

OTHER PUBLICATIONS

Russian Decision on Grant and Search Report dated Apr. 15, 2021 for Application No. 2020121129 with a partial English translation.
(Continued)

*Primary Examiner* — Michael E Gallion
(74) *Attorney, Agent, or Firm* — Birch, Stewart, Kolasch & Birch, LLP

(57) ABSTRACT

A hoisting device includes a body, a hoisting rope, a rope drum arranged in connection with the body, on which a first end of the hoisting rope is fastened, and a hoisting part which ascends and descends by means of the hoisting rope. The hoisting device includes a fastening device of a second end of the hoisting rope, which is formed into a loop wherein a spiral groove is substantially surrounding the entire loop and in which the part adjacent to the second end of the hoisting rope is received. The hoisting device further has a fastening arrangement which locks the second end of the hoisting rope to the fastening device, preventing the second end from being pulled out of the fastening device.

13 Claims, 5 Drawing Sheets

(51) Int. Cl.
  *B66D 3/06*   (2006.01)
  *F16G 11/04*  (2006.01)

(56) References Cited

U.S. PATENT DOCUMENTS

| | | | | |
|---|---|---|---|---|
| 10,273,128 | B2* | 4/2019 | Kosuga | B66D 3/22 |
| 10,486,948 | B2* | 11/2019 | Kosuga | B66D 3/08 |
| 10,549,958 | B2* | 2/2020 | Yudate | B66D 3/22 |
| 2017/0081152 | A1* | 3/2017 | Kosuga | B66D 3/26 |
| 2017/0107084 | A1* | 4/2017 | Yudate | B66C 13/18 |
| 2018/0346295 | A1* | 12/2018 | Kosuga | B66D 1/22 |
| 2019/0135595 | A1* | 5/2019 | Lindberg | B66D 1/30 |

FOREIGN PATENT DOCUMENTS

| | | |
|---|---|---|
| EP | 3 150 546 A1 | 4/2017 |
| EP | 3 193 039 A1 | 7/2017 |
| JP | 57-81275 U | 5/1982 |
| JP | 8-113472 A | 5/1996 |
| JP | 11-217181 A | 8/1999 |
| SU | 998320 A1 | 2/1983 |
| WO | WO 2015/182772 A1 | 12/2015 |

OTHER PUBLICATIONS

Chinese Office Action and Search Report for Chinese Application No. 201880079813.0, dated May 20, 2021, with an English translation.
International Preliminary Report on Patentability, issued in PCT/FI2018/050910, dated Feb. 11, 2020.
International Search Report, issued in PCT/FI2018/050910, dated Feb. 20, 2019.
Written Opinion of the International Searching Authority, issued in PCT/FI2018/050910, dated Feb. 20, 2019.

* cited by examiner

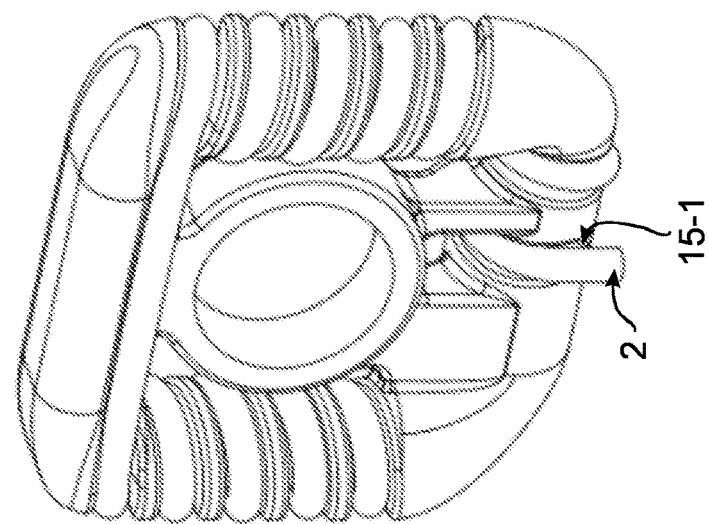
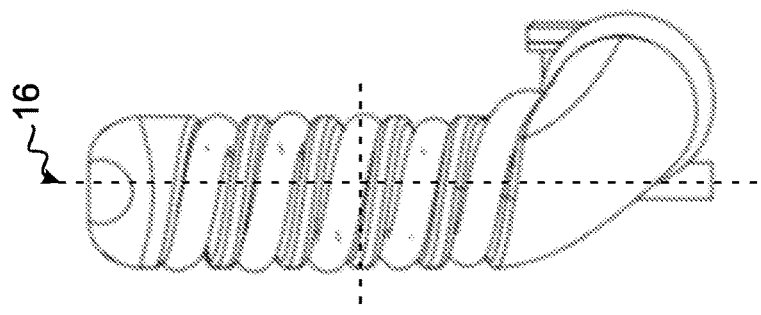
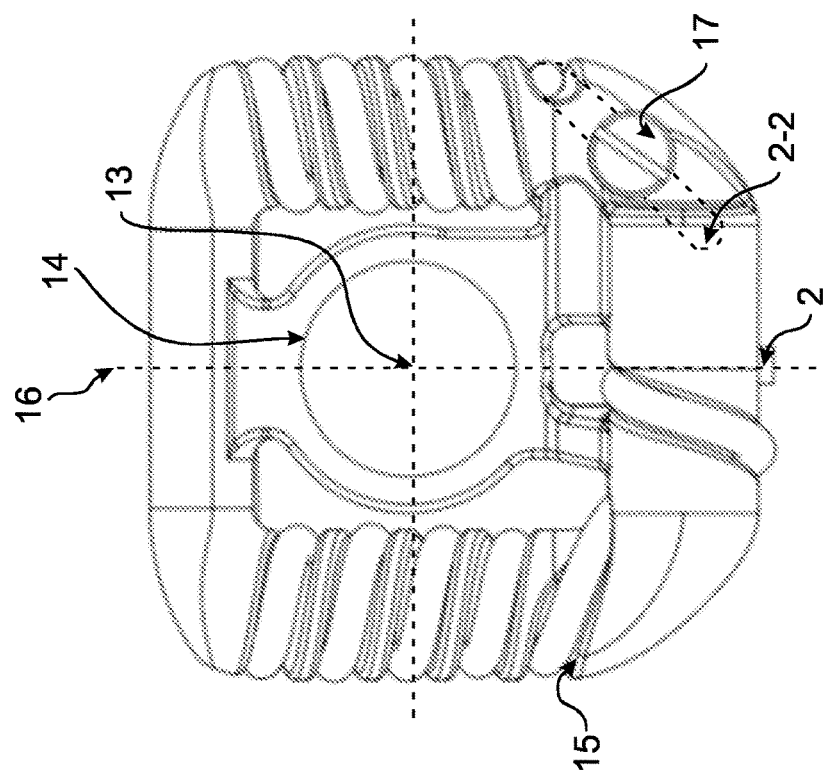

FASTENING DEVICE FOR HOISTING ROPE OF HOISTING DEVICE

BACKGROUND OF THE INVENTION

The invention relates to a device for fastening an end of a hoisting rope to a hoisting device.

It is previously known to use steel ropes as the hoisting ropes of hoisting devices. To fasten a steel rope to a hoisting device, a wedge pocket and rope tighteners, for example, are often employed. The solution in question is well-suited for use with a steel rope, but with ropes that include other materials this solution has proven to be disadvantageous.

The object of the solution set forth here is to develop a fastening method for a hoisting rope, allowing the material of the hoisting rope to be selected more freely than before to match the use.

BRIEF DESCRIPTION OF THE INVENTION

The aforementioned object is achieved with a hoisting device according to the invention, which is characterised in that it comprises a body, a hoisting rope and a rope drum arranged in connection with the body, on which a first end of the hoisting rope is fastened and around which the hoisting rope winds, as well as a hoisting part which ascends and descends, by means of the hoisting rope, and in that said hoisting device further comprises a fastening device of a second end of the hoisting rope, having at least one portion in which is formed a spiral groove surrounding said portion and in which the part adjacent to the second end of the hoisting rope is received to surround said portion, and in that the hoisting device has a fastening arrangement which locks the second end of the hoisting rope to the fastening device, preventing the second end from being pulled out of the fastening device. With such a solution it is possible to utilize friction to fasten the hoisting rope, resulting in that the material of the hoisting rope may be more freely chosen to match the use.

BRIEF DESCRIPTION OF THE DRAWINGS

The invention will now be described in more detail in connection with preferred embodiments and with reference to the accompanying drawings, in which:

FIGS. 3a to 3c show a first embodiment of a fastening device suitable for the hoisting device of FIGS. 1 and 2;

DETAILED DESCRIPTION OF THE INVENTION

Figure 1:
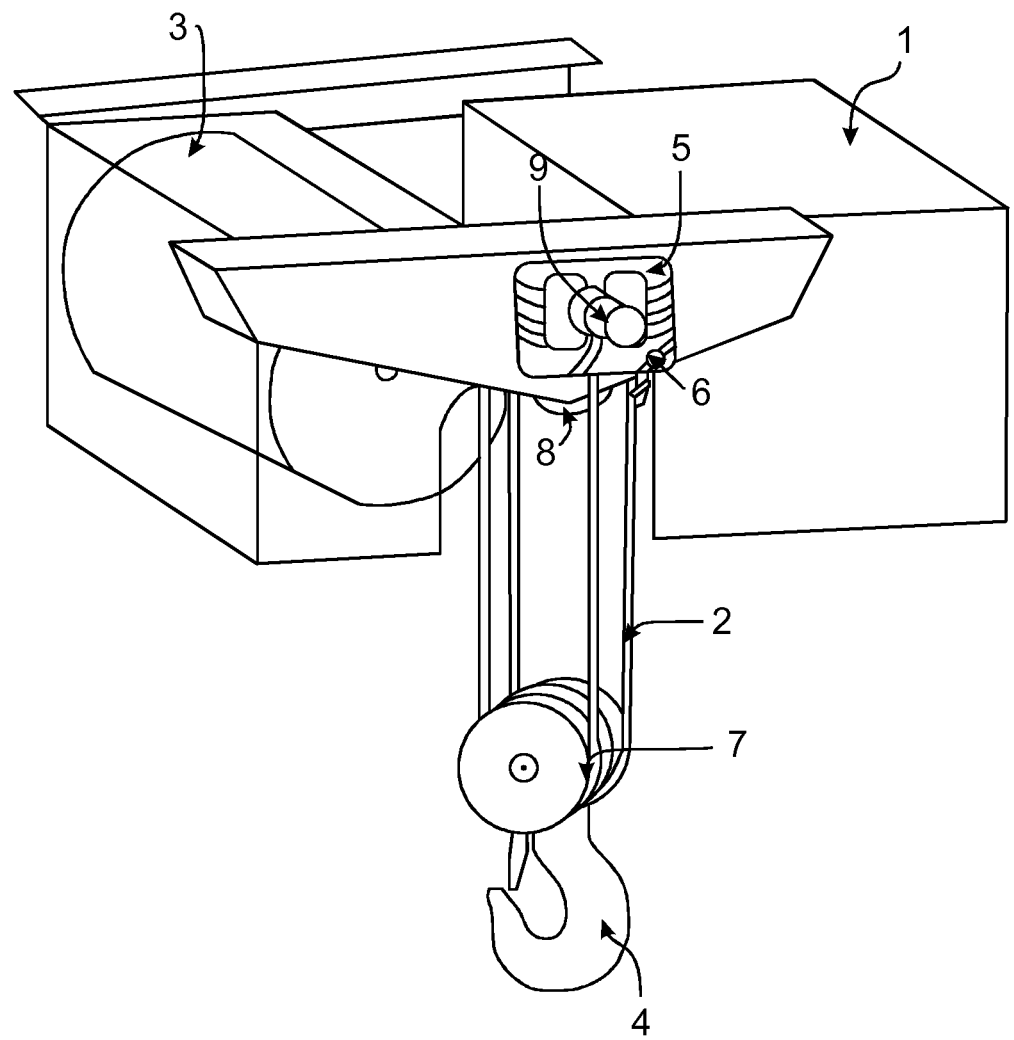
FIG. 1 show a first embodiment of the hoisting device.

With reference to FIG. 1, the fastening device for fastening a synthetic rope to the hoisting device comprises, as its main components, a body 1 of the hoisting device, a hoisting rope 2, a rope drum 3 arranged in connection with the body, a hoisting part 4, a fastening device 5 of a second end of the hoisting rope 2, having at least one portion in which is formed a spiral groove surrounding said portion and in which the part adjacent to the second end of the hoisting rope 2 is received to surround said portion, and a fastening arrangement 6 which locks the second end of the hoisting rope to the fastening device 5. As the material of the fastening device 5, aluminium, for example, may be used whereby it is not necessary to coat or paint it against corrosion, for example. Alternatively, painted steel may be used.

Said fastening device 5 of the second end of the hoisting rope 2 is in this embodiment fastened to, for example, the body 1 of the hoisting device, as shown in FIG. 1. The fastening is advantageously so implemented that the joint is detachable and rotating. Detachable fastening makes it possible to change the location of the fastening device 5, if needed, and rotating fastening allows the fastening device to rotate around a fastening point, if a load being hoisted should swing, for example.

When the fastening device 5 is fastened to the body 1 of the hoisting device, it is necessary to fix at least one first sheave 7 to the hoisting part 4, which receives the hoisting rope 2 from the rope drum 3. In the embodiment of FIG. 1, the hoisting rope 2 extends for a plurality of times between the hoisting part 4 and body part 1, due to which there is one second sheave 8 arranged in connection with the body part. In this example, the fastening device is fastened to the same shaft 9 with the second sheave 8.

Said portion of the fastening device 5 is in the example of FIG. 1 formed into a closed loop so that it goes around a fastening point arranged at a centre part of the fastening device 5, by means of which the fastening device 5 is fastened to the hoisting device. Said loop may alternatively be open at some location. The loop may have an angular form, or at least partly rounded, as shown in FIG. 1.

The fastening device 5 may be made of cast iron or steel, and the hoisting rope 2 may be a synthetic hoisting rope, such as a Dyneema® rope, where Dyneema® is a trademark the holder of which is DSM IP Assets B.V.

Figure 2:
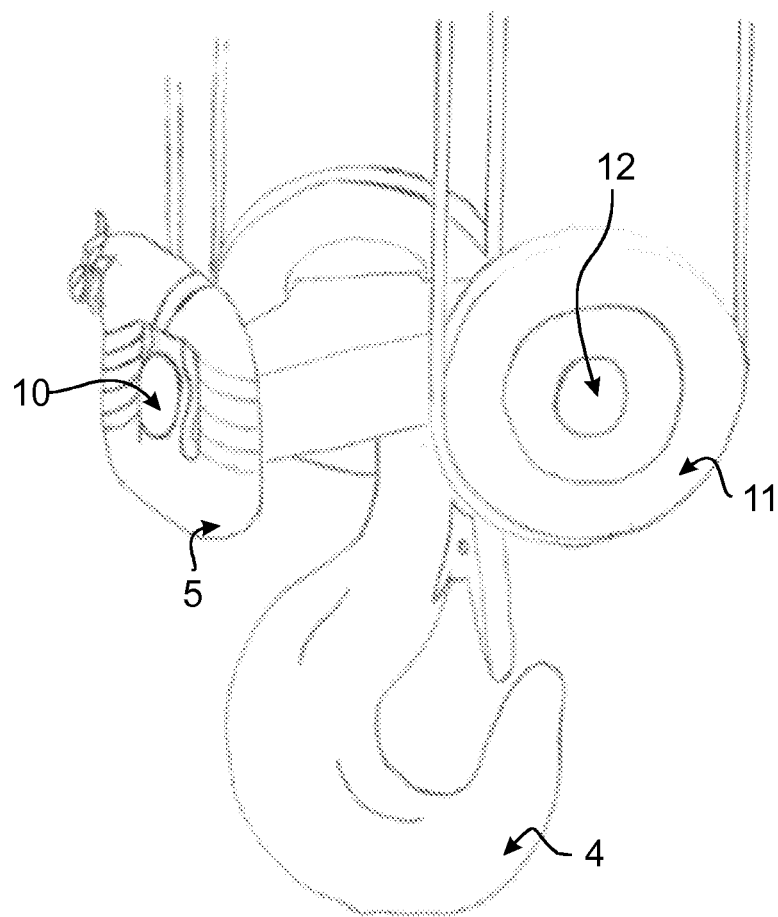
FIG. 2 show a second embodiment of the hoisting device.

FIG. 2 illustrates a second embodiment of the hoisting device. The embodiment of FIG. 2 largely corresponds to the embodiment of FIG. 1, wherefore in the following the embodiment of FIG. 2 will be explained primarily by disclosing differences between these embodiments. In this example, the fastening device 5 is fastened is connection with the hoisting part 4 on a separate shaft 10. Differing from the example, the fastening device 5 may alternatively be fastened on the same shaft 12 with the sheave 11 either simultaneously with the sheave 11 or in place of the sheave 11.

FIGS. 3a to 3c show the first preferred embodiment of the fastening device, which may be utilised in the embodiments of FIGS. 1 and 2. The portion referred to in FIGS. 3a to 3c has been formed into a closed, square loop with rounded corners. In this example, the fastening device 5 has a fastening point 13 formed on the inside of its loop, which is formed by an opening 14 which may be threaded to an end of a shaft, or through which a fastening bolt, for example, may be threaded. Alternatively, the fastening point 13 of the fastening device 5 may be arranged on the outside of the loop.

With reference to FIGS. 3a and 3b, the fastening point 13 of the fastening device 5 is advantageously so positioned that the point between the first and second end 2-2 of the hoisting rope 2, at which the hoisting rope 2 is received in a groove 15 of the hoisting device 5, is located on the same vertical line 16 as the fastening point 13 of the fastening device 5. This way, the creation of a torsional moment on the fastening device 5 is avoided. In the groove 15 of the fastening device 5, this point is in the vicinity of the first end 15-1 of the groove 15, as shown in FIG. 3c.

As FIGS. 3a to 3c show, in a preferred embodiment, the loop is at least partially arranged to surround the groove 15 which receives the second end 2-2 of the hoisting rope. Said groove 15 may also substantially surround the entire loop. It is advantageous to arrange a plurality of groove rounds in said portion, because the plurality of groove rounds increases friction between the hoisting rope and fastening device and thus ensures an adequate hold of the fastening. In addition, the surface of the groove 15 may be treated to increase friction. Adding friction for the groove 15 may be implemented, for example, by coating the groove 15, or by forming protrusions in the groove 15 at its manufacturing stage, which enhance friction.

The groove 15 is substantially round, or at least rounded, and the shape of the groove is substantially semi-circular, and the dimensioning of the groove is a close match with the outer diameter of the hoisting rope 2 being used. Therefore, when subjected to tension, the groove 15 supports the hoisting rope 2 from the sides so that the hoisting rope cannot collapse, in particular when it is subjected to a tensile strength. When arranged advantageously, the groove 15 continues further than the receiving point of the hoisting rope 2 so that the movement of the hoisting rope 2 along the groove 15 is possible without a contact with sharp corners, as will be explained below in connection with swinging motions.

Figure 4B:
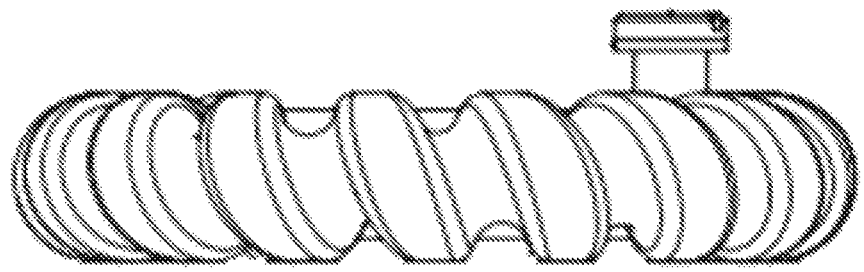
FIGS. 4a and 4b show a second embodiment of a fastening device suitable for the hoisting device of FIGS. 1 and 2.
Figure 4A:
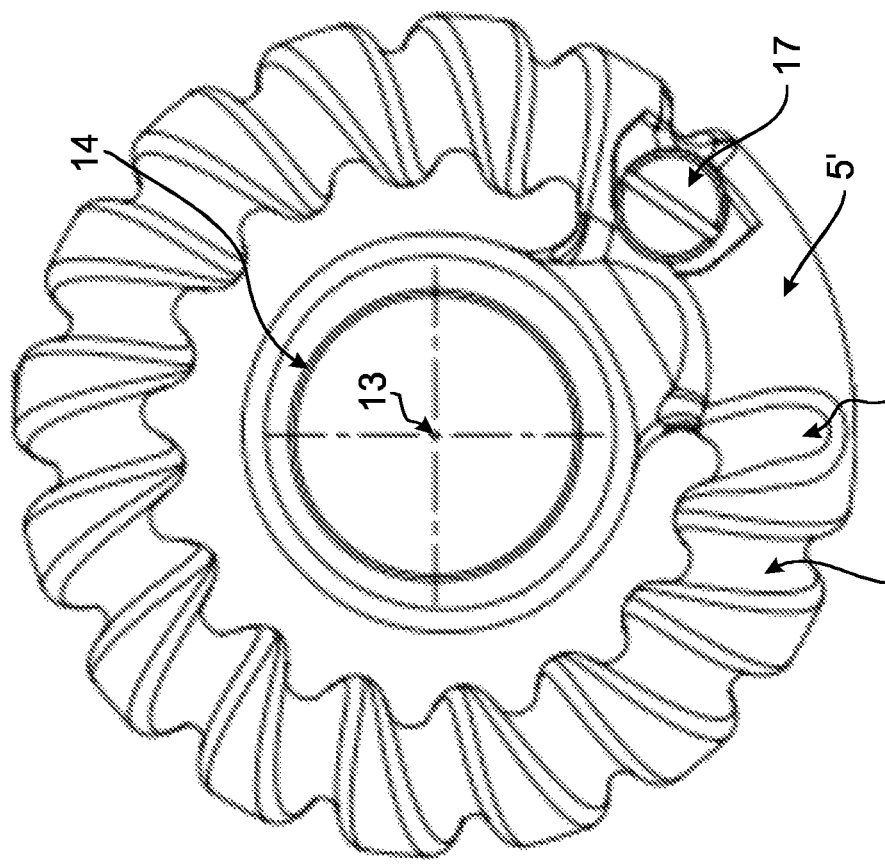

FIGS. 4a to 4b show a second preferred embodiment of the fastening device, which may be utilised in the embodiments of FIGS. 1 and 2. The embodiment of FIGS. 4a and 4b largely corresponds to the embodiment of FIGS. 3a to 3c, wherefore in the following the embodiment of FIGS. 4a and 4b will be explained primarily by disclosing differences between these embodiments. The embodiment of FIGS. 4a and 4b comprises a fastening device 5', whose said portion encircled by said groove 15 is formed into a circular, closed loop. In the embodiment in question, said groove 15 surrounds substantially the entire loop.

Referring still to FIGS. 3a to 3c and FIGS. 4a and 4b, the hoisting rope 2 is received on the fastening device from the vicinity of the first end 15-1 of the groove, after which the hoisting rope 2 is at least partially arranged in the groove 15. Finally, the second end 2-2 of the hoisting rope 2 is fastened to the fastening device by a fastening arrangement.

Figure 5:
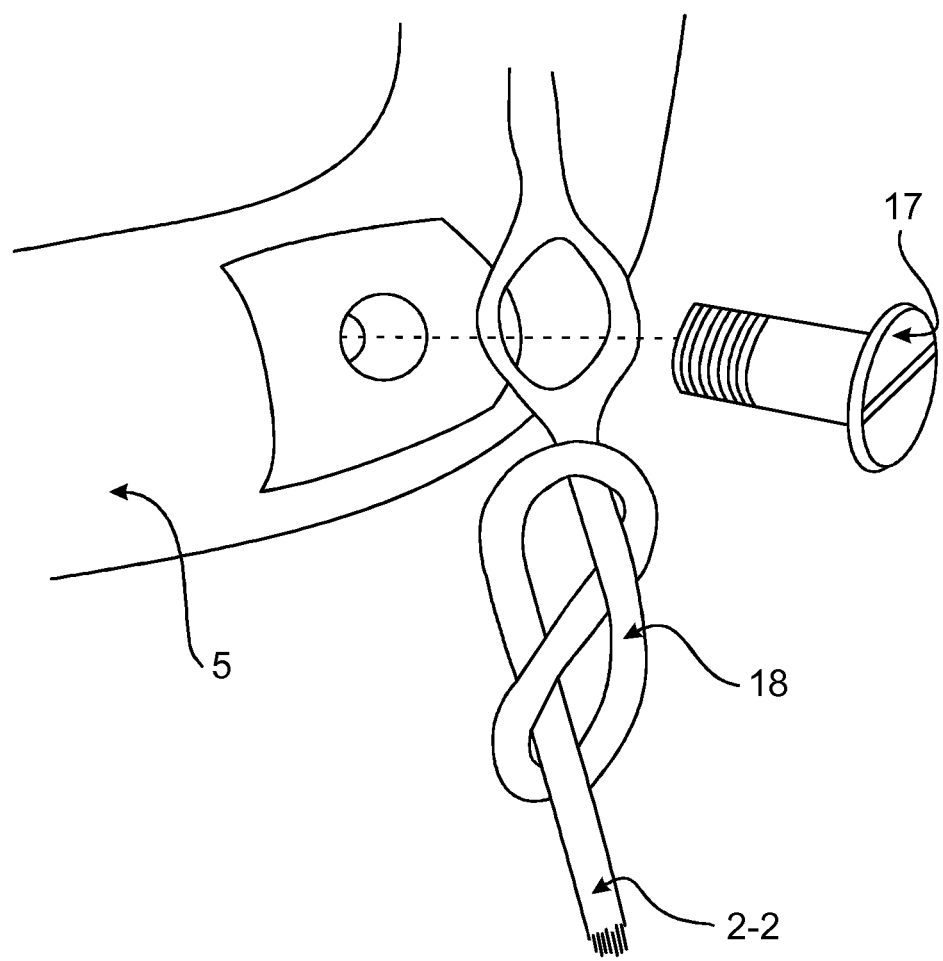
FIG. 5 show an embodiment of a fastening of a second end of a hoisting rope suitable from the fastening device of FIGS. 3 to 4.

FIG. 5 shows a fastening arrangement by way of example. The fastening arrangement in question comprises a fastening means, such as a bolt 17 and a knot 18, such as a figure eight knot, tied to the second end 2-2 of the hoisting rope 2. In this fastening arrangement in question, the hoisting rope 2 is opened slightly on the portion at the groove side, and through the formed gap a bolt 17 is adapted, which is fastened to the fastening device by turning it, and which thus locks the second end 2-2 of the hoisting rope 2 in place. The knot in such a case prevents the rope end, which was slightly opened, from unravelling.

Differing from FIG. 5, the fastening device may have a hole through which the second end 2-2 of the hoisting rope 2 is threaded, after which a knot is tied to the second end 2-2 of the hoisting rope 2 to prevent the pulling out of the hoisting rope 2. In such a case, the screw shown in FIG. 5 is not needed in the fastening arrangement, but the knot and hole keep the second end of the rope in place in the fastening device.

In the above, it is disclosed by way of example and with reference to the drawings that the portion of the fastening device, around which the hoisting rope is threaded, has been formed into a loop. However, this is only an example of a preferred embodiment, which allows the effectuation of such a compact fastening device which fits to be fastened, for example, coaxially with a sheave on an extension of the sheave shaft. Alternatively, it is also possible that said portion is formed into a straight rod.

Differing from the examples of the figures, the fastening arrangement may comprise the threading of the second end 2-2 of the hoisting rope 2 under itself and, following the under-threading, tensioning whereby the under-threaded hoisting rope part is tensioned between the hoisting rope 2 and fastening device 5. Fastening may be further improved by tying a knot to the end of the under-threaded hoisting rope 2, thus preventing the pulling out of the hoisting rope when the hoisting rope 2 is in a tensioned state.

Still differing from the figures, the fastening arrangement may comprise a plate and fastening means by means of which the second end 2-2 of the hoisting rope 2 is tensioned between said plate and fastening device 5. This fastening arrangement may also be further improved by tying a knot to the second end 2-2 of the hoisting rope 2 to prevent the pulling out of the hoisting rope 2 when the hoisting rope 2 is in a tensioned state.

In different embodiments, insofar as swinging of a load is concerned, the fact may be noted that a swing of the load to any direction from the perpendicular may be structurally taken into consideration. For example, in the direction according to FIG. 1, the issue is a lateral swinging motion, which is taken into account by providing the fastening device with a fastening point 13 around which the fastening device may rotate. When the swinging motion is transverse in relation to the aforementioned lateral movement, that is, swaying in the direction of the shaft of the pin of the fastening point 13, it may be taken into account by lengthening the groove of the rope under the lowest edge of the fastening device. In practise, all swinging motions and situations of pulling aslant may be divided into the two directions of motion referred to in the above.

A person skilled in the art will find it obvious that, as technology advances, the basic idea of the invention may be implemented in many different ways.

The invention and its embodiments are thus not restricted to the above-described examples but may vary within the scope of the claims.

The invention claimed is:
1. A hoisting device comprising:
a body;
a hoisting rope;
a rope drum arranged in connection with the body, on which a first end of the hoisting rope is fastened and around which the hoisting rope winds;
a hoisting part which ascends and descends, by means of the hoisting rope;
a fastening device of a second end of the hoisting rope, the fastening device forming a loop around a fastening point on the body, wherein a spiral groove is formed around a surface of the loop at least two revolutions, each revolution being 360 degrees, and wherein a part of the hoisting rope adjacent to the second end of the hoisting rope is received in the spiral groove; and
a fastening arrangement which locks the second end of the hoisting rope to the fastening device, preventing the second end from being pulled out of the fastening device.
2. The hoisting device as claimed in claim 1, wherein in connection with the hoisting part there is at least one sheave which receives the hoisting rope from the rope drum, and wherein said fastening device which receives the hoisting rope from the sheave is detachably and rotatably fixed to the body.

3. The hoisting device as claimed in claim 1, wherein said fastening device of the hoisting rope is detachably and rotatably fixed to an end of the sheave shaft.

4. The hoisting device as claimed in claim 1, wherein said loop goes around a fastening point arranged at a centre part of the loop, by means of which the fastening device is fastened to the hoisting device.

5. The hoisting device as claimed in claim 4, wherein said loop is a closed loop.

6. The hoisting device as claimed in claim 4, wherein said loop is an open loop.

7. The hoisting device as claimed in claim 4, wherein said loop is an angular loop.

8. The hoisting device as claimed in claim 4, wherein said loop is at least partly a circular loop.

9. The hoisting device as claimed in claim 1, wherein a point between the first and second end of the hoisting rope, at which the hoisting rope is received in a groove of the hoisting device, is located on the same vertical line as the fastening point of the fastening device.

10. The hoisting device as claimed in claim 1, wherein said fastening arrangement which locks the second end of the hoisting rope to the fastening device comprises a bolt by means of which the second end of the hoisting rope is fastened to the fastening device.

11. The hoisting device as claimed in claim 1, wherein said fastening arrangement which locks the second end of the hoisting rope to the fastening device comprises a knot by means of which the second end of the hoisting rope is fastened to the fastening device.

12. The hoisting device as claimed in claim 1, wherein the groove of the fastening device is rounded and dimensioned to match the outer diameter of the hoisting rope.

13. The hoisting device as claimed in claim 1, wherein said hoisting rope comprises a synthetic material.

\* \* \* \* \*